United States Patent
Tanaka

(10) Patent No.: US 6,900,902 B1
(45) Date of Patent: May 31, 2005

(54) IMAGE DETERMINING APPARATUS CAPABLE OF PROPERLY DETERMINING IMAGE AND IMAGE FORMING APPARATUS UTILIZING THE SAME

(75) Inventor: Hiroharu Tanaka, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 882 days.

(21) Appl. No.: 09/661,798

(22) Filed: Sep. 14, 2000

(30) Foreign Application Priority Data

Sep. 17, 1999 (JP) .......................................... 11-263329

(51) Int. Cl.$^7$ .......................... G06F 13/00; G06F 15/00
(52) U.S. Cl. ....................... 358/1.13; 358/1.9; 358/448; 358/462; 271/286; 271/288; 271/290; 271/298
(58) Field of Search ................................ 358/1.13, 1.9, 358/448, 462; 371/286, 288, 290, 298

(56) References Cited

U.S. PATENT DOCUMENTS

| | | | |
|---|---|---|---|
| 5,287,204 A | | 2/1994 | Koizumi et al. |
| 5,420,694 A | * | 5/1995 | Matsumoto .................. 358/462 |
| 5,978,557 A | * | 11/1999 | Kato .......................... 358/1.15 |

FOREIGN PATENT DOCUMENTS

| JP | 4-336876 | 11/1992 |
|---|---|---|
| JP | 6-22072 | 1/1994 |
| JP | 6-225167 | 8/1994 |
| JP | 7-123282 | 5/1995 |
| JP | 7-222012 | 8/1995 |
| JP | 11-3001 | 1/1996 |
| JP | 11-27542 | 1/1999 |

* cited by examiner

*Primary Examiner*—Edward Coles
*Assistant Examiner*—Alan Rahimi
(74) *Attorney, Agent, or Firm*—McDermott Will & Emery LLP

(57) ABSTRACT

A copying machine performs a panel operation necessary for copying at a step S601 and performs ACS determination for determining whether an original image is a color image, a monochrome image or an indefinite image at a step S603. Then, the copying machine performs copying at a step S605 according to a print mode responsive to a result of ACS determination. At this time, a printed paper for an indefinite image is discharged to a discharge position different from that for another printed paper. The copying machine displays the result of the ACS determination on an operation panel at a step S607. Therefore, an original determined as the indefinite image can be recognized at a glance so that a countermeasure can be immediately taken if reprinting is necessary. Consequently, it is possible to provide an image forming apparatus capable of immediately performing proper processing on an original image by readily detecting an improper result of printing caused by false determination as to whether the original image is a color image or a monochrome image.

12 Claims, 19 Drawing Sheets

FIG. 5A

| | | | | | | | | |
|---|---|---|---|---|---|---|---|---|
| 00 H | 10 H | 20 H | | | | D0 H | E0 H | F0 H |
| 01 H | 11 H | 21 H | | | | D1 H | E1 H | F1 H |
| | | | | | | | | |
| 0E H | 1E H | 2E H | | | | DE H | EE H | FE H |
| 0F H | 1F H | 2F H | | | | DF H | EF H | FF H |

REFERENCE READING POSITION → MAIN SCANNING DIRECTION

SUB SCANNING DIRECTION

FIG. 5B

| OFFSET ADDRESS OF ACS MEMORY (12-bit DATA) | |
|---|---|
| NUMBER OF COLOR PIXELS IN BLOCK 00H | xxx00H |
| NUMBER OF COLOR PIXELS IN BLOCK 01H | xxx01H |
| NUMBER OF COLOR PIXELS IN BLOCK 02H | xxx02H |
| NUMBER OF COLOR PIXELS IN BLOCK 03H | xxx03H |
| NUMBER OF COLOR PIXELS IN BLOCK 04H | xxx04H |
| NUMBER OF COLOR PIXELS IN BLOCK 05H | xxx05H |
| NUMBER OF COLOR PIXELS IN BLOCK 06H | xxx06H |
| NUMBER OF COLOR PIXELS IN BLOCK 07H | xxx07H |

F I G. 8
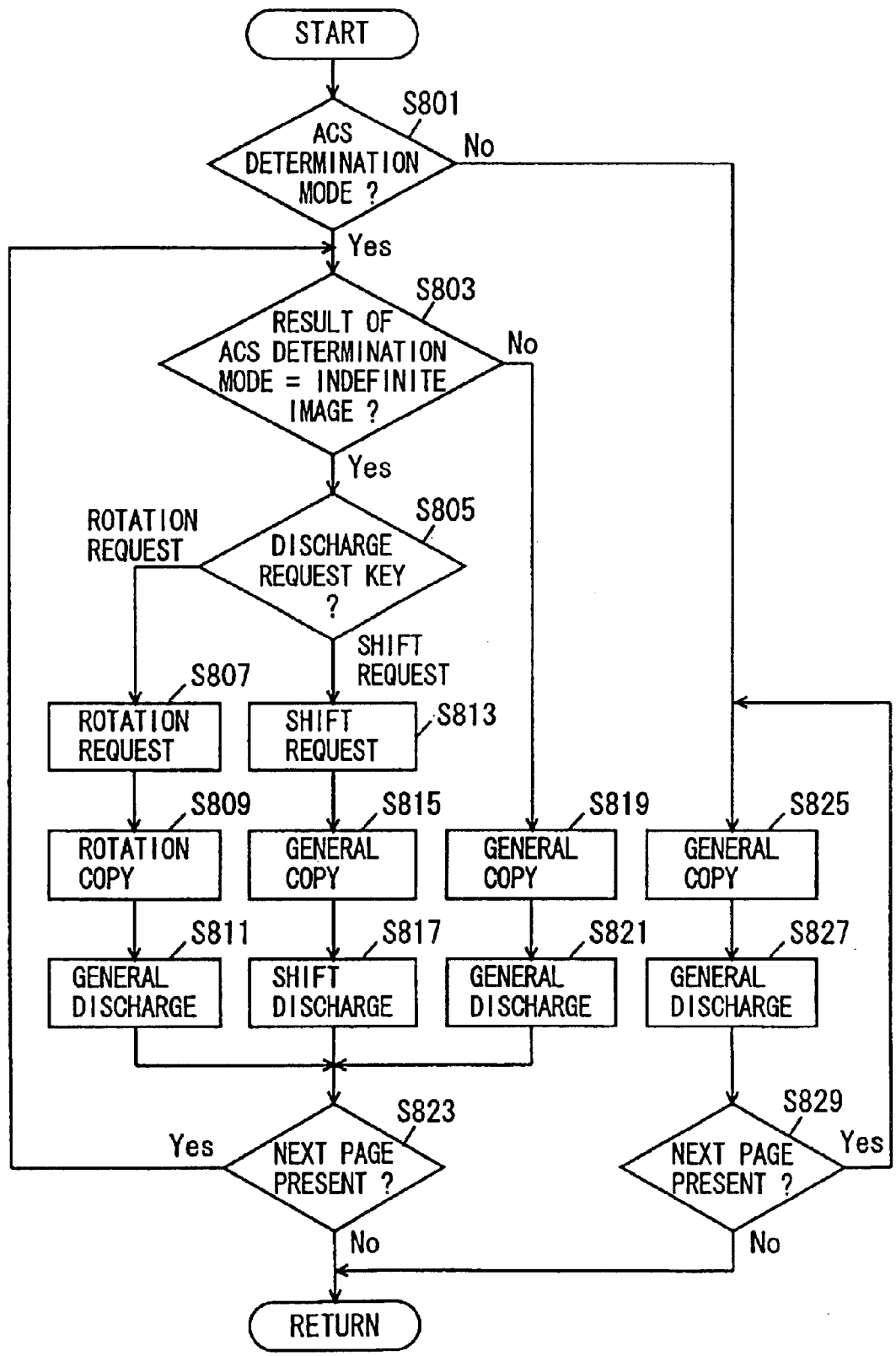

SHIFT DISCHARGE

ROTATION DISCHARGE

F I G. 1 8

| ACS LEVEL | CONDITION FOR DETERMINATION ON COLOR IMAGE |
|---|---|
| LEVEL 1 | CONDITION 1: NUMBER OF BLOCKS HAVING AT LEAST 800 COLOR PIXELS IS AT LEAST 1<br>CONDITION 2: NUMBER OF BLOCKS HAVING AT LEAST 500 COLOR PIXELS IS AT LEAST 3 |
| LEVEL 2 | CONDITION 1: NUMBER OF BLOCKS HAVING AT LEAST 700 COLOR PIXELS IS AT LEAST 1<br>CONDITION 2: NUMBER OF BLOCKS HAVING AT LEAST 400 COLOR PIXELS IS AT LEAST 3 |
| LEVEL 3 | CONDITION 1: NUMBER OF BLOCK HAVING AT LEAST 600 COLOR PIXELS IS AT LEAST 1<br>CONDITION 2: NUMBER OF BLOCKS HAVING AT LEAST 300 COLOR PIXELS IS AT LEAST 3 |
| LEVEL 4 | CONDITION 1: NUMBER OF BLOCK HAVING AT LEAST 500 COLOR PIXELS IS AT LEAST 1<br>CONDITION 2: NUMBER OF BLOCKS HAVING AT LEAST 200 COLOR PIXELS IS AT LEAST 3 |

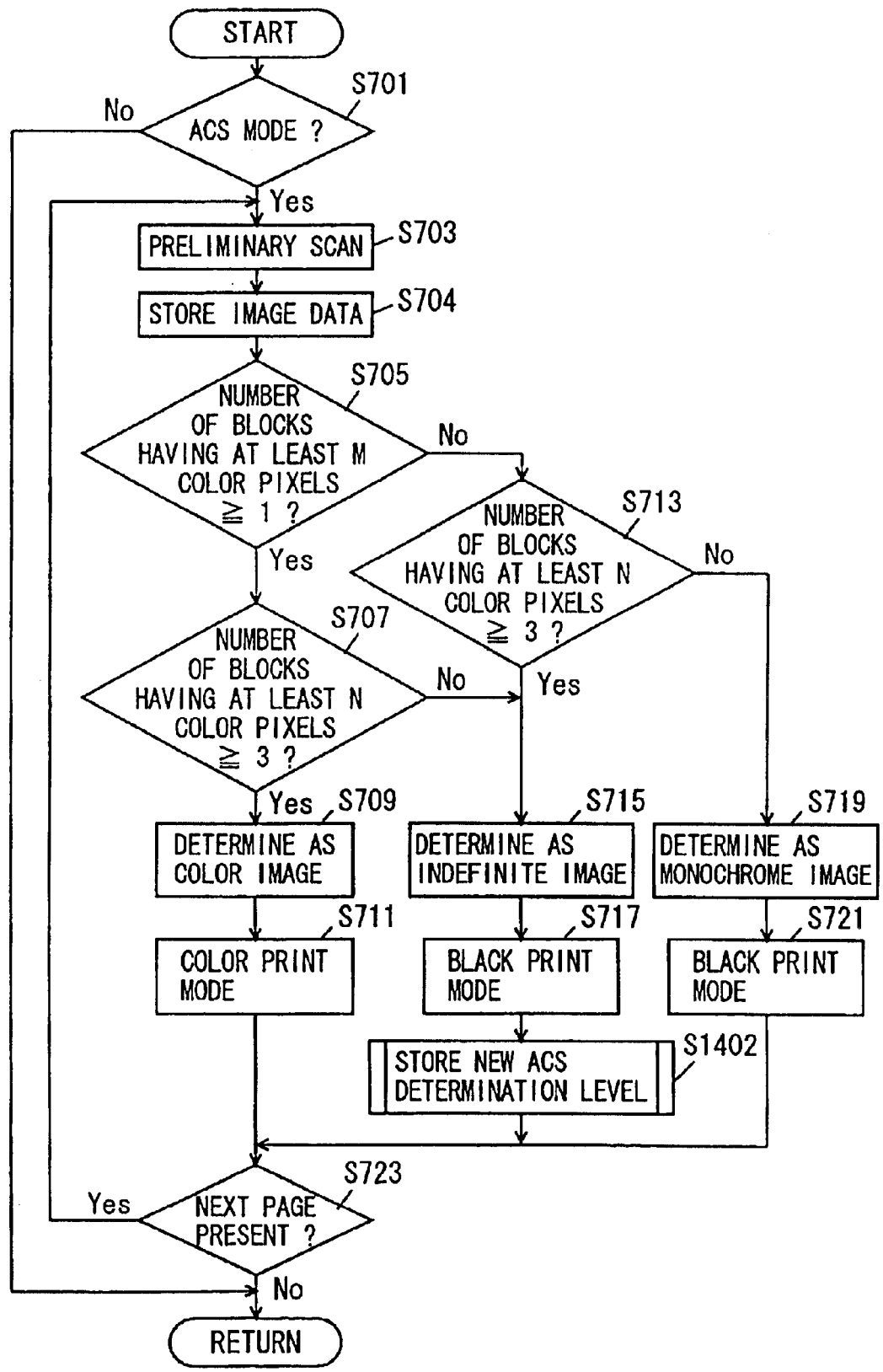

IMAGE DETERMINING APPARATUS CAPABLE OF PROPERLY DETERMINING IMAGE AND IMAGE FORMING APPARATUS UTILIZING THE SAME

This application is based on application No. 11-263329 filed in Japan, the contents of which is hereby incorporated by reference.

BACKGROUND OF THE INVENTION

1. Field of the Invention

The present invention relates to an image determining apparatus and an image forming apparatus, and more particularly, it relates to an image determining apparatus automatically determining whether an original image is a color image or a monochrome image and an image forming apparatus comprising the image determining apparatus for forming an image with a colorant of a color or a black colorant.

2. Description of the Related Art

In a general image forming apparatus such as a color copying machine, a printing method varies with whether an original image is a color image or a monochrome image. In other words, a color image is printed with colorants of chromatic colors such as C (cyan), M (magenta) and Y (yellow), for example, while a monochrome image is printed with an achromatic black colorant.

If a user of such a color copying machine must sequentially input the types (color or monochrome) of original images and perform operations varying with the original images, however, extremely complicated operations are required. In general, therefore, a method of automatically determining the type of each original image (this operation is hereinafter referred to as ACS (auto color select)) for printing the original image in response to the result of determination is employed for the color copying machine.

Therefore, a copy of the original image can be readily formed without requiring the user to input the type (color or monochrome) of the original image or change the copy operation in response to the type of the original image.

However, the conventional image forming apparatus clearly determines only whether the original image is a color image or a monochrome image. Also as to a subtle image almost indistinguishable between a color image and a monochrome image, therefore, the conventional image forming apparatus disadvantageously determines as either a color image or a monochrome image.

If the image forming apparatus makes false determination in this case, it follows that the subtle image is printed by a false printing method based on the false determination. Therefore, the user must search for a printed image (in particular, a copy of a color image falsely printed with a black colorant is referred to as "miscopy") based on false determination every copying for recopying the image if necessary. When copying originals including a number of color images and monochrome images, therefore, the user must take the trouble of finding out miscopies from a number of copied papers for reprinting the same with extremely complicated operations.

Particularly when performing reprinting, the user must reread the original images through operations further requiring time in addition to the time for detecting the miscopies.

Further, it follows that a monochrome image falsely determined as a color image is subjected to color printing not with a black colorant but with all colorants of C (cyan), M (magenta), Y (yellow) and K (black). This state cannot definitely be regarded as preferable in consideration of the speed and the cost required for image formation, the picture quality and the like.

SUMMARY OF THE INVENTION

Accordingly, an object of the present invention is to provide an image determining apparatus and an image forming apparatus capable of preventing false determination as to whether an original image is a color image or a monochrome image by displaying a result of determination for reducing complicatedness of subsequent processing resulting from such false determination.

Another object of the present invention is to provide an image forming apparatus capable of readily detecting a result of improper printing on an original image thereby immediately performing proper processing on the image.

Still another object of the present invention is to provide an image forming apparatus capable of performing reprinting in a short time when the reprinting is necessary.

The aforementioned objects of the present invention are attained by an image determining apparatus including the following elements: According to an aspect of the present invention, an image determining apparatus comprises a determining part determining whether an original image is a color image, a monochrome image or an indefinite image hard to determine on the basis of image data corresponding to the original image and a display part displaying a result of determination by the determining part.

According to this aspect of the present invention, the image determining apparatus determines a subtle image as an indefinite image without determining whether the image is a color image or a monochrome image and displays the result of determination, whereby false determination can be prevented. Therefore, it is possible to provide an image determining apparatus capable of reducing complicatedness of subsequent processing resulting from false determination and further properly performing processing on the image.

When a plurality of original images are present, the display part preferably displays a list of results of the determination.

Preferably, the display part displays results of the determination with three types of marks indicating a color image, a monochrome image and an indefinite image.

Preferably, the display part displays an indefinite image with no mark.

Thus, a list of results of the determination is so displayed that the results of the determination can be readily understood at a glance with respect to the plurality of originals.

Preferably, the display part displays page numbers of the original images and results of the determination in association with each other.

Thus, the results of the determination are displayed in association with pages, whereby the association with the pages is so clarified that the results of the determination can be more readily recognized.

Preferably, the display part displays a result of the determination only as to an original image determined as the indefinite image.

Preferably, the display part displays the result of the determination by displaying only the page number of the original image determined as the indefinite image.

Thus, only the indefinite image requiring further determination etc. is displayed. Thus, only necessary information can be obtained from the results of the determination at a glance, so that post-processing can be more readily performed.

Preferably, the image determining apparatus further comprises a storage part storing image data of an original image determined as the indefinite image. The display part displays the original image determined as the indefinite image on the basis of the image data stored in the storage part.

The image determined as the indefinite image is displayed, and hence whether or not the result of the determination is correct can be immediately determined.

According to another aspect of the present invention, an image forming apparatus comprises a determining part determining whether an original image is a color image, a monochrome image or an indefinite image hard to determine on the basis of image data corresponding to the original image, a print part printing the original image on a sheet, a discharge part discharging the sheet formed with an image by the print part and a control part making the discharge part discharge a sheet formed with an original image determined as the indefinite image in a different mode from another sheet.

Thus, only the sheet printed with the indefinite image is discharged in a different method among all printed sheets, whereby a result of printing on the indefinite image can be readily confirmed. Therefore, it is possible to provide an image forming apparatus capable of reducing complicatedness of subsequent processing on an improper print based on false determination.

Preferably, the control part makes the discharge part discharge the sheet formed with the original image determined as the indefinite image in a state shifted by a prescribed quantity with respect to another sheet.

Preferably, the control part makes the discharge part discharge the sheet formed with the original image determined as the indefinite image in a state rotated by a prescribed angle with respect to another sheet.

Thus, the sheet printed with the indefinite image can be discharged in a different state from another sheet by a simple method, whereby a result of improper printing can be readily detected.

According to still another aspect of the present invention, an image forming apparatus comprises a determining part determining whether an original image is a color image, a monochrome image or an indefinite image hard to determine on the basis of image data corresponding to the original image on the basis of a prescribed criterion, a print part printing the original image on a sheet, a storage part storing image data of at least an original image determined as the indefinite image, an operation part accepting an operation requiring reprinting of the original image determined as the indefinite image and a control part controlling the print part to reprint the original image determined as the indefinite image on the basis of the image data stored in the storage part when reprinting is required through the operation part.

According to this aspect of the present invention, the data of the image determined as the indefinite image is so stored that proper printing can be immediately performed with no rereading when reprinting is required.

Preferably, the image forming apparatus further comprises a mode decision part deciding a print mode for the original image as a color mode printing the original image with a colorant or a black mode printing the original image with a black colorant on the basis of a result of the determination, and the control part controls the print part to reprint the original image determined as the indefinite image in a print mode different from the print mode decided by the mode decision part.

Thus, when reprinting is required, the original image is printed in a different mode and not subjected to reprinting with the same colorant. Therefore, unnecessary printing resulting from a false input or the like is prevented and unnecessary consumption of colorants can be suppressed.

Preferably, the mode decision part decides a print mode for the original image determined as the indefinite image as the black mode, and the control part controls the print part to reprint the original image determined as the indefinite image in the color mode.

Thus, the indefinite image is first printed in black at a low cost and reprinted in the color mode, whereby the cost can be saved.

Preferably, the image forming apparatus further comprises a display part displaying the original image on the basis of the image data stored in the storage part, and the operation part accepts an operation displaying the original image determined as the indefinite image on the display part while accepting an operation requiring reprinting of the displayed original image.

Thus, the original image determined as the indefinite image can be readily confirmed on the display part so that whether or not printing has been proper can be determined without checking the printed sheet. Further, proper reprinting can be immediately performed when reprinting is required on the basis of a result of the determination.

Preferably, the control part changes the criterion of the determining part when executing reprinting of the original image determined as the indefinite image.

Thus, the criterion for determining the image is changed in response to a request made by a user for reprinting the indefinite image, whereby the type of the image can be thereafter more properly determined.

Preferably, the storage part stores all original images determined by the determining part.

All original images determined by the determining part are so stored that any original image necessary for reprinting or the like can be immediately read without rereading the original images.

According to a further aspect of the present invention, an image forming apparatus comprises a determining part determining whether an original image is a color image, a monochrome image or an indefinite image hard to determine on the basis of image data corresponding to the original image, a mode decision part deciding a print mode for the original image as a color mode printing the original image with a colorant or a black mode printing the original image with a black colorant on the basis of a result of the determination, a print part printing the original image on a sheet according to the print mode decided by the mode decision part, an operation part accepting an operation requiring change of the print mode decided by the mode decision part on an original image determined as the indefinite image and a control part controlling the print part to print the original image determined as the indefinite image in a changed print mode in place of the print mode decided by the mode decision part when change of the print mode is required through the operation part.

According to this aspect of the present invention, a proper print instruction for the original image determined as the indefinite image can be supplied through the operation part before printing the same. Therefore, it is possible to provide an image forming apparatus capable of reducing complicatedness of subsequent processing resulting from false determination and improper printing based thereon.

Preferably, the image forming apparatus further comprises a storage part storing image data of at least the original image determined as the indefinite image and a display part displaying the original image on the basis of the image data stored in the storage part, and the operation part accepts an operation displaying the original image determined as the indefinite image on the display part while accepting an operation requiring change of the print mode for the displayed original image.

Thus, the original image determined as the indefinite image can be readily confirmed on the display part. Therefore, a request for change of the print mode can be properly made on the basis of a result of the display before printing.

Preferably, the mode decision part decides the print mode for the original image determined as the indefinite image as the black mode.

Thus, an image falsely printed on the basis of false determination is subjected to low-priced black printing, and hence the cost can be saved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are diagrams for illustrating the association between block positions of an original read area and an ACS memory part;

FIG. 8 is a flow chart showing the flow of copy processing (step S605) shown in FIG. 6;

FIG. 18 shows ACS determination levels for illustrating ACS determination level change processing according to a first modification;

FIG. 19 is a flow chart showing the flow of ACS determination processing (step S1303) shown in FIG. 13 according to a second modification;

DESCRIPTION OF THE PREFERRED EMBODIMENTS

Embodiments of the present invention are now described with reference to the drawings.

(1) First Embodiment

Figure 1:
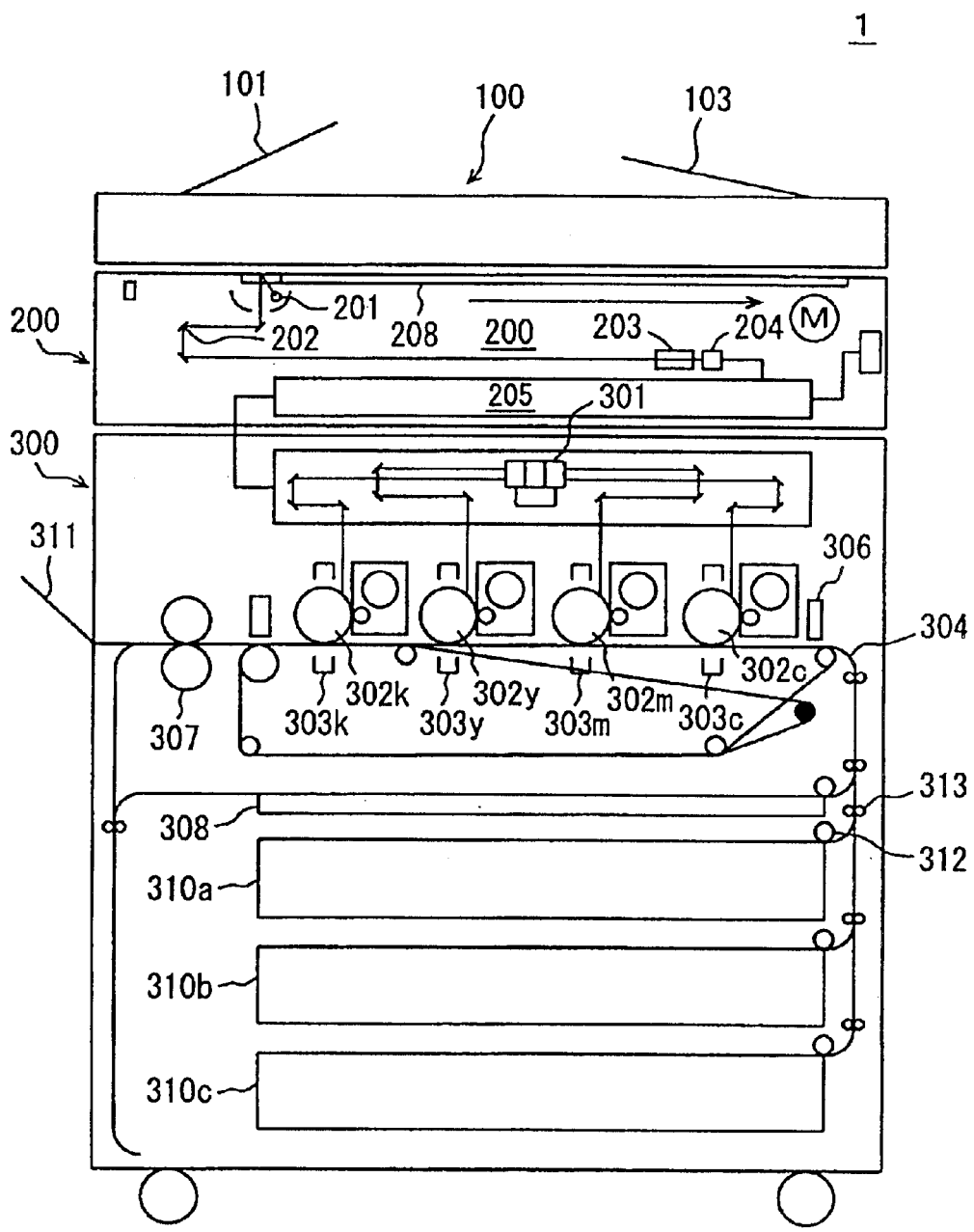
FIG. 1 is a total block diagram of a digital color copying machine according to a first embodiment of the present invention.

Referring to FIG. 1, a digital color copying machine 1 according to a first embodiment of the present invention is roughly formed by an automatic document feeder 100, an image reading part 200 and an image forming part 300.

The automatic document feeder 100 feeds an original set on a paper feed tray 101 to a reading position and discharges the original on a copy discharge tray 103 after completely reading the original. When a plurality of originals are present, the automatic document feeder 100 repeats the series of processing by the number of the originals.

The image reading part 200 reads an image of the original fed to the reading position, performs necessary image processing etc. and thereafter outputs necessary data to the image forming part 300. Light applied from an exposure lamp 201 and reflected by the original set on a platen 208 forms an image on a CCD sensor 204 through a mirror group 202 and a lens 203. The light reflected by the original is converted to an electric signal by the CCD sensor 204, and thereafter fed to the image forming part 300 as digital image data through analog processing, A-D conversion, digital image processing etc. in an image processing circuit 205.

The image forming part 300 forms an image on a paper on the basis of the digital image data of the original received from the image reading part 200. More specifically, a laser unit (not shown) outputs a laser beam on the basis of the digital image data received from the image reading part 200, converted to print data of cyan (C), magenta (M), yellow (Y) and black (K). A polygon mirror 301 polarizes the laser beam for exposing photoreceptors 302$c$, 302$y$, 302$m$ and 302$k$ of cyan, magenta, yellow and black charged by corona chargers and forming electrostatic latent images.

The electrostatic latent images formed on the photoreceptors 302$c$, 302$y$, 302$m$ and 302$k$ are developed with toners of the respective colors according to a general electrophotographic process, so that toner images formed on the photoreceptors 302$c$, 302$y$, 302$m$ and 302$k$ are transferred to a paper located on transfer positions by transfer chargers 303$c$, 303$y$, 303$m$ and 303$k$.

The paper subjected to transfer is previously set on a paper feed cassette group 310 (310a to 310c), transported to a transport path by a paper feed roller 312 and fed to a paper transport belt 304 by a transport roller 313. A timing sensor 306 adjusts transport timing on the paper transport belt 304 for successively transporting papers to the transfer positions of the cyan, yellow, magenta and black photoreceptors 302c, 302y, 302m and 302k.

As described above, the toner images of four colors are successively transferred onto the paper on the respective transfer positions and thereafter a pair of fixing rollers 307 apply heat and pressure to fix the toner images of four colors to the paper. The paper having the toner images fixed thereto in the aforementioned manner is discharged onto a discharge tray 311.

Figure 2:
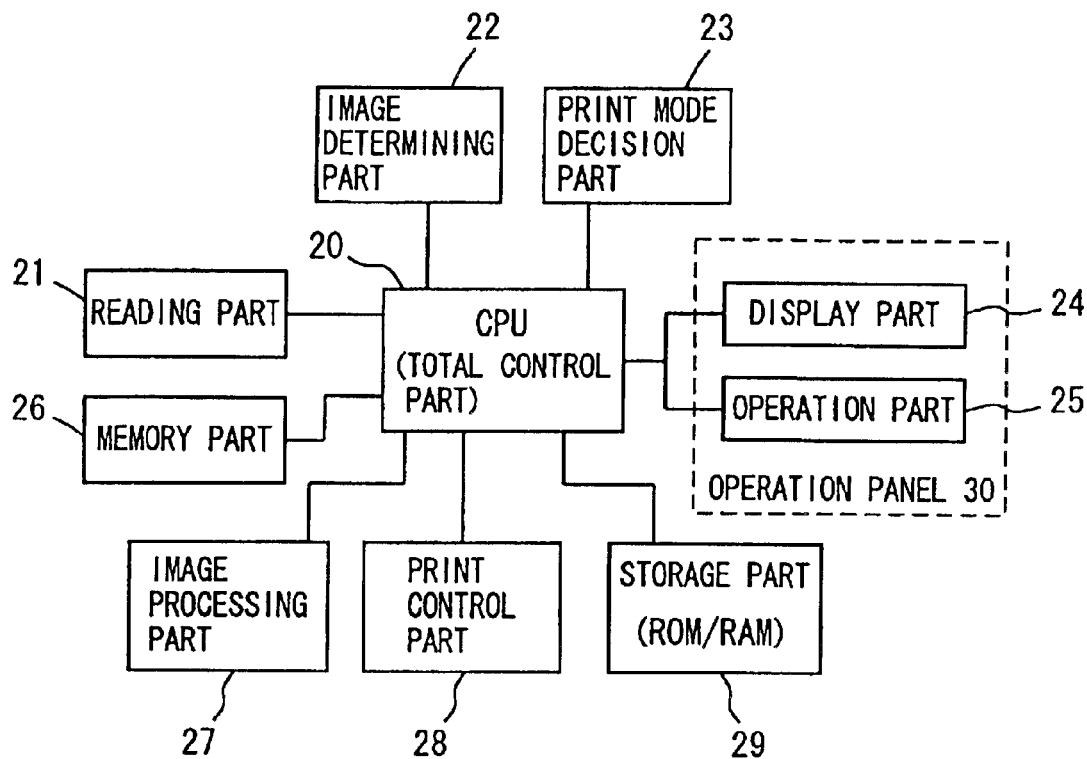
FIG. 2 is a functional block diagram of a control part of the copying machine shown in FIG. 1.

FIG. 2 is a functional block diagram showing a control part of the copying machine shown in FIG. 1. Referring to FIG. 2, the control part of the copying machine includes a total control part 20 for controlling the overall copying machine, a reading part 21 for reading an original image and obtaining prescribed RGB data, an image determining part 22 for determining whether the original image is a color image, a monochrome image or an indefinite image on the basis of the RGB data fed from the reading part 1, a print mode decision part 23 deciding a print mode on the basis of a result of the determination by the image determining part 22, a display part 24 for displaying the result of the determination by the image determining part 22, an operation part 25 for making various instructions on the basis of the result displayed on the display part 21, and a memory part 26 storing the data of the original image read by the reading part 21, the result of the determination by the image determining part 22 and the like.

The print mode decision part 23 selects a color print mode when the image determining part 22 determines the original image as a color image while selecting a black print mode when the former determines the latter as a monochrome image or an indefinite image.

While the print mode decision part 23 selects the black print mode for the indefinite image in consideration of economy and the like, the color print mode may alternatively be selected for the indefinite image. When selecting the color print mode for the indefinite image, no miscopy is formed by printing a color image with a black colorant and hence necessity for reprinting is reduced.

The control part of the copying machine further includes an image processing part 27 performing prescribed image processing on a signal read by the reading part 21, a print control part 28 controlling the image forming part 300 and a storage part 29 for storing a program, data necessary for processing and the like.

Figure 3:
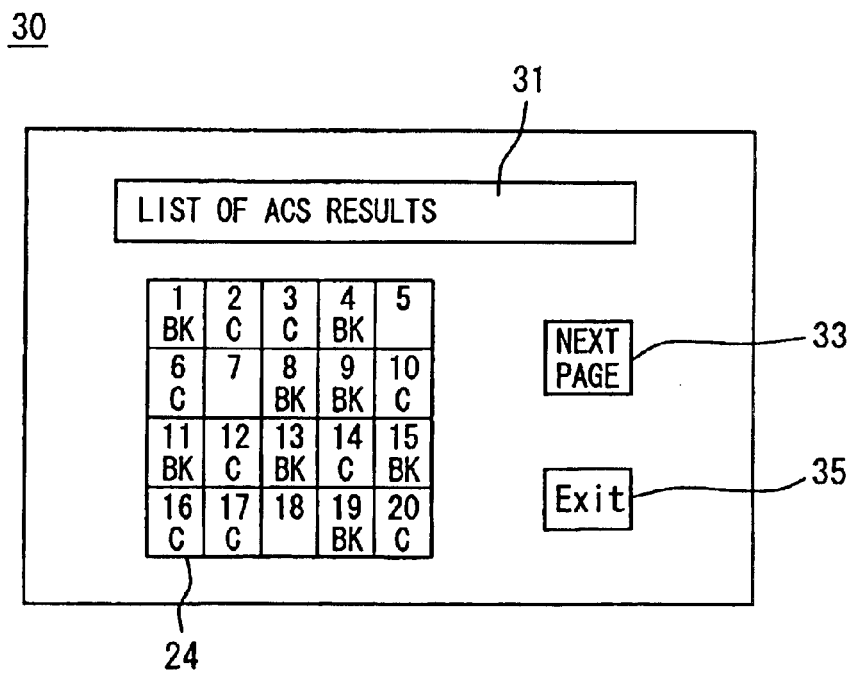
FIG. 3 is a plan view of an operation panel provided on the digital color copying machine shown in FIG. 1.

FIG. 3 is a plan view of an operation panel 30 provided on the digital color copying machine shown in FIG. 1. Referring to FIG. 3, the operation panel 30 includes a display part 24 for displaying results of ACS image determination to an operator and an operation part 25 formed by an ACS result list key 31 for making the display part 24 display the results of the ACS determination, a next page key 33 for making the display part 24 display the next page of a list of the results, and an Exit key 35 for exiting from an ACS display mode.

The display part 24 associates page numbers and the results of the ACS determination in order of pages of originals and simultaneously displays data for 20 pages. The display part 24 displays pages determined as color images with "C" under page numbers, pages determined as monochrome images with "BK" under the page numbers and pages determined as indefinite images with no characters under the page numbers, for displaying a list of the results of the determination. Alternatively, the display part 24 may display pages determined as indefinite images with "indefinite" under the page numbers.

Figure 4:
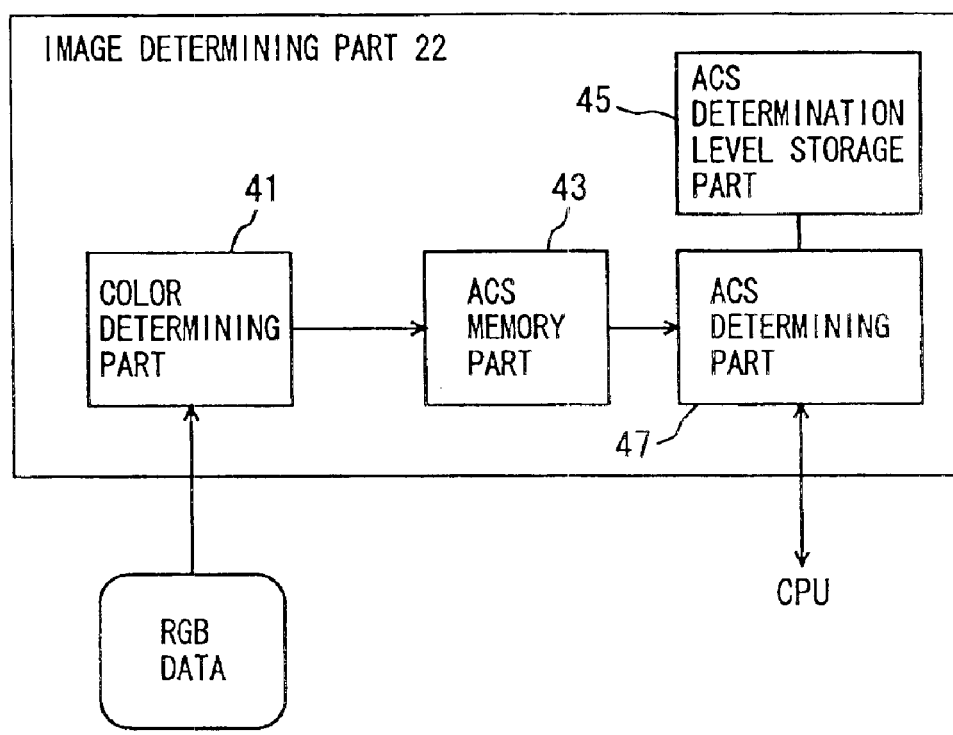
FIG. 4 is a functional block diagram for illustrating operations of an image determining part shown in FIG. 3.

FIG. 4 is a functional block diagram for illustrating operations of the image determining part 22 shown in FIG. 3. Referring to FIG. 4, the image determining part 22 includes a color determining part 41 for determining whether or not each pixel is a color pixel according to RGB data (saturation data) as to each pixel input from the reading part 21, an ACS memory part 43 for storing the number of pixels determined as color pixels by the color determining part 41 every prescribed pixel unit (hereinafter referred to as "block"), an ACS determination level storage part 45 for storing a prescribed determination level as the reference for making ACS determination and an ACS determining part 47 determining whether an original image is a color image, a monochrome image or an indefinite image on the basis of results stored in the ACS memory part 43.

FIGS. 5A and 5B are diagrams for illustrating the association between positions of blocks of an original reading area and the ACS memory part 43. FIG. 5A illustrates positions and numbers of 256 blocks obtained by dividing the original reading area in units of 512*512 dots, and FIG. 5B shows the contents of the ACS memory part 43 storing the numbers of color pixels for the corresponding blocks respectively.

Referring to FIG. 5A, the reading part 21 divides the reading area of an image into 256 blocks each formed by a square area of 512*512 dots with each side formed by 512 dots along a main scanning direction and a sub scanning direction. The respective blocks are numbered OOH through FFH from a reference read position so that the numbers of color pixels in the respective blocks are stored in association with such block numbers.

As shown in FIG. 5B, the ACS memory part 43 stores the numbers of color pixels counted in the blocks with the block numbers shown in FIG. 5A serving as offset addresses.

Figure 6:
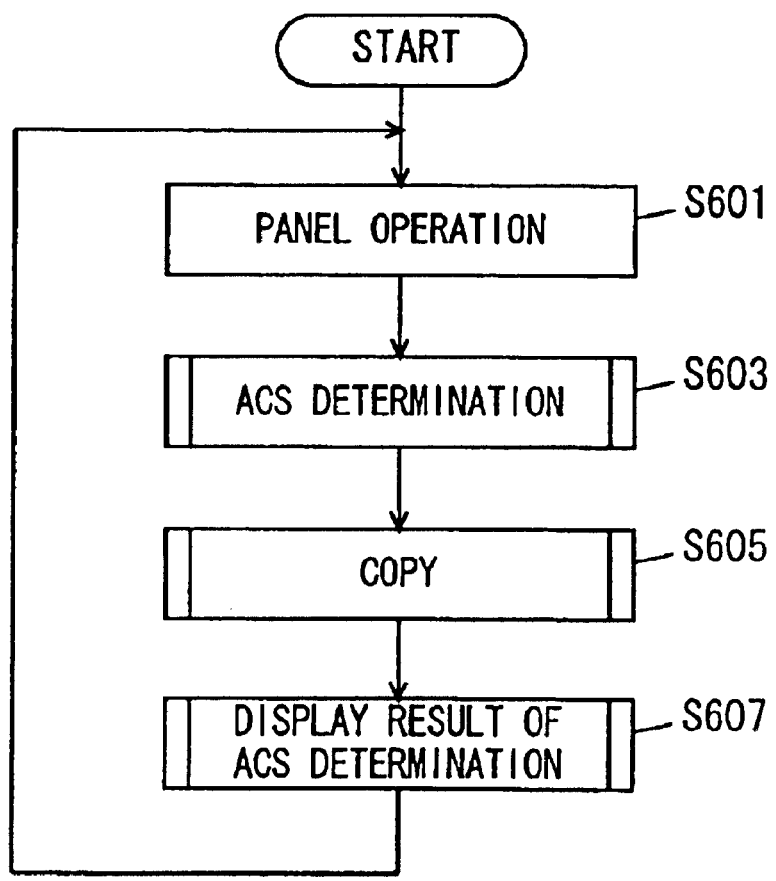
FIG. 6 is a flow chart showing a main routine of processing executed by the control part shown in FIG. 2.

FIG. 6 is a flow chart showing a main routine of processing executed by the control part shown in FIG. 2. The total control part 20 executes this processing by load the program stored in the storage part 29.

Referring to FIG. 6, the control part first accepts initial panel operations such as entry of a copy number and a print key, setting of various modes etc. made by a user at a step S601.

Then, the control part performs ACS determination for determining whether the original image is a color image, a monochrome image or an indefinite image at a step S603. Then, the control part performs copy processing according to the print mode responsive to the result of the ACS determination at a step S605. At this time, the control part discharges a paper printed with an indefinite image to a discharge position different from that for another print paper. The control part performs ACS determination result display processing for displaying the result of the ACS determination on the operation panel 30 at a step S607, and returns to the processing of the step S601.

Figure 7:
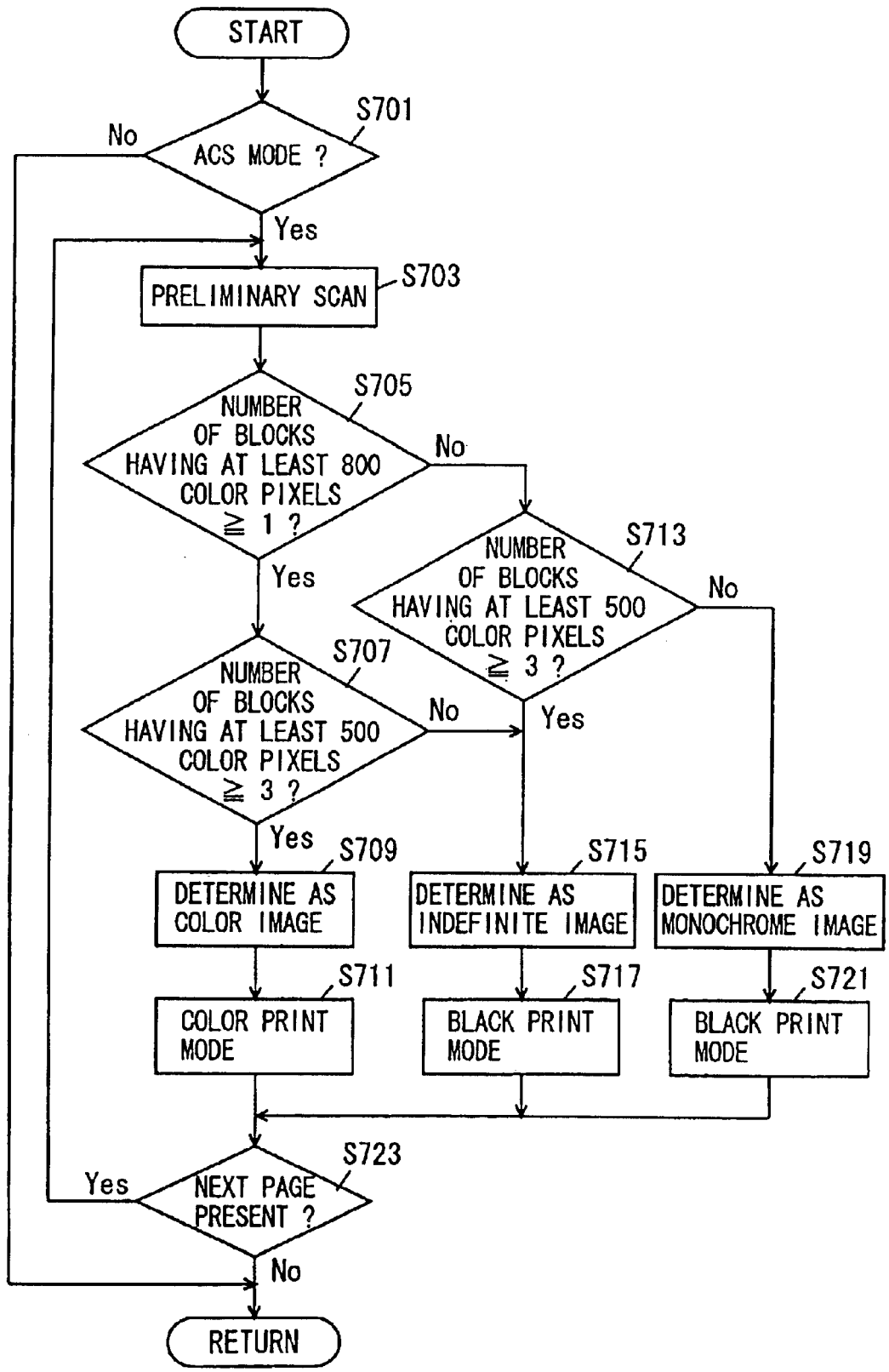
FIG. 7 is a flow chart showing the flow of ACS determination processing (step S603) shown in FIG. 6.

FIG. 7 is a flow chart showing the flow of the ACS determination processing (step S603) shown in FIG. 6. Referring to FIG. 7, the control part first determines whether or not an ACS mode is set through the panel operations (step S601) shown in FIG. 6 at a step S701. If the ACS mode is not set, the control part ends this sub routine and shifts to the copy operation at the step S605.

If the ACS mode is set (YES at the step S701), the control part preliminarily scans the original for ACS determination at a step S703. Then, the control part makes ACS determination at steps S705, S707 and S713.

The control part determines whether or not the number of blocks having at least 800 color pixels is at least one at the step S705. If the number is at least one, the control part determines whether or not the number of blocks having at least 500 color pixels is at least three at the step S707. If the number is at least three, the control part determines the original image as a color image at a step S709.

If the number of blocks having at least 800 color pixels is less than one at the step S705, the control part determines whether or not the number of blocks having at least 500 color pixels is at least three at the step S713. When determining that the number is at least three, the control part determines the original image as an indefinite image at a step S715. Also when determining that the number of blocks having at least 500 color pixels is less than three at the step S707, the control part determines that the original image is an indefinite image at the step S715.

When determining that the number of blocks having at least 500 color pixels is less than three at the step S713, the control part determines the original image as a monochrome image at a step S719.

The aforementioned flow of the ACS determination is summarized as follows: The original image is determined as a color image when satisfying the condition (hereinafter referred to as "condition 1") that the number of blocks having at least 800 color pixels is at least one and the condition (hereinafter referred to as "condition 2") that the number of blocks having at least 500 color pixels is at least three, while determined as a monochrome image when satisfying neither the condition 1 nor the condition 2. When satisfying only one of these conditions, i.e., when satisfying not the condition 2 but the condition 1 or satisfying not the condition 1 but the condition 2, the original image is determined as an indefinite image almost indistinguishable between a color image and a monochrome image.

The control part decides various print modes according to results of the aforementioned determination. The control part selects the color print mode at a step S711 when determining the original image as a color image at the step S709, while selecting the black print mode at a step S717 or a step S721 when determining the original image as an indefinite image at the step S715 or as a monochrome image at the step S719.

After deciding the print mode, the control part advances to processing at a step S723. The control part returns to the step S703 if a next original is present, while ending the sub routine if no next original is present.

FIG. 8 is a flow chart showing the flow of the copy processing (step S605) shown in FIG. 6. Referring to FIG. 8, the control part first determines whether or not the ACS mode is set through the panel operations (step S601) shown in FIG. 6. If the ACS mode is not set, the control part performs general copy processing through steps S825, S827 and S829. In other words, the control part discharges a paper subjected to general copying to a general position.

If the ACS mode is set (YES at the step S801), the control part determines whether or not the result of the ACS determination is an indefinite image at a step S803.

If the result is an indefinite image, the control part determines whether shift discharge or rotation discharge is selected at a step S805. The user can arbitrarily select this discharge method through a selection key or the like.

When rotation discharge is selected at the step S805, the control part issues a rotation request at a step S807 for copying the indefinite image according to the rotation request at a step S809. The control part selects a copy paper having a different direction from those set in the paper feed tray group 310 (310a to 310c) and transports this paper to the transfer positions. Images are formed in a state rotated by 90° and transferred to the paper.

The control part generally discharges the paper thus subjected to copying in a rotated state onto the discharge tray 311 in this state at a step S811. Thus, it follows that the paper subjected to copying in the rotated state is discharged in the state rotated by 90° with respect to papers subjected to general copying.

When shift discharge is selected at the step S805, the control part issues a shift discharge request for shifting the discharge tray 311 at a step S813. The control part copies the indefinite image on a general copy paper as general (without rotating the paper) at a step S815 and makes shift discharge at a step S817. In other words, the paper subjected to copying is discharged onto the discharge tray 311 located on a position shifted from the general position.

When the result of the ACS determination is not an indefinite image at the step S803, the control part makes general copying at a step S819 and discharges the paper subjected to copying onto the discharge tray 311 located on the general position at a step S821.

After discharging the paper at the step S811, S817 or S821, the control part advances to a step S823 for determining whether or not a next original is present, and repeats the aforementioned processing until all originals are completely copied.

Figure 9:
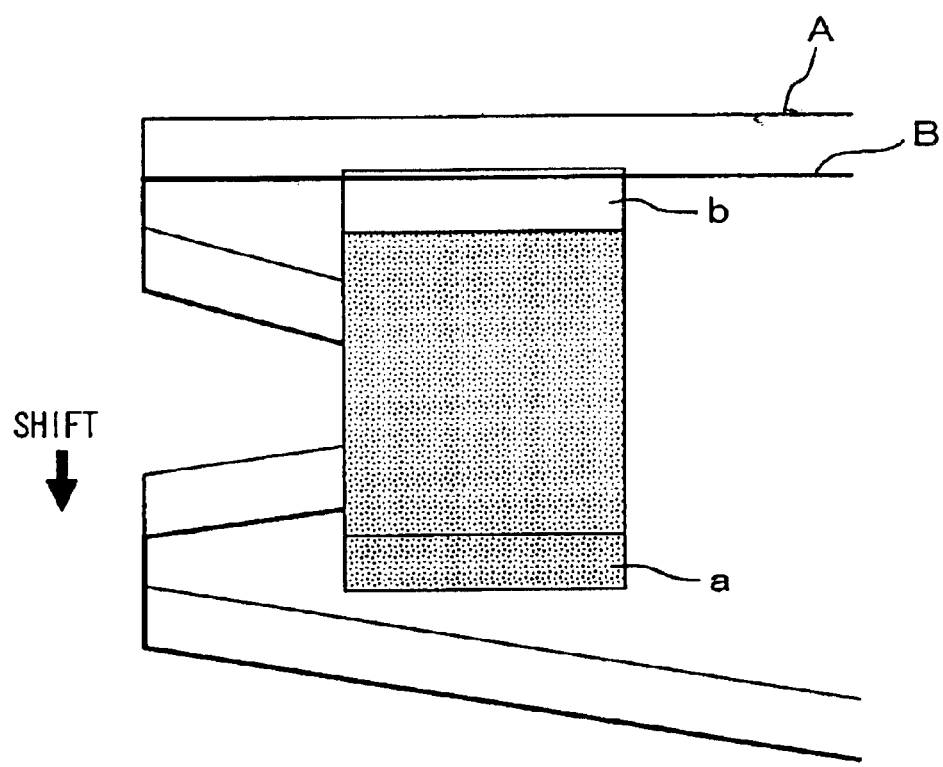
FIG. 9 is a diagram illustrating a state of discharging a paper subjected to copying when a result of ACS determination indicates an indefinite image.

FIG. 9 is a diagram for illustrating a state of discharging a paper subjected to copying when the result of the ACS determination is an indefinite image. As shown in FIG. 9, the discharge tray 311 is shifted along arrow from a stationary position A when a shift discharge request is issued at the step S805 shown in FIG. 8. The discharge tray 311 receives the paper formed with the image of the original determined as an indefinite image on a shifted tray position B. Therefore, it follows that the paper for the indefinite image is discharged to a position b shifted from a position a of a generally discharged paper on the discharge tray 311.

Figure 10:
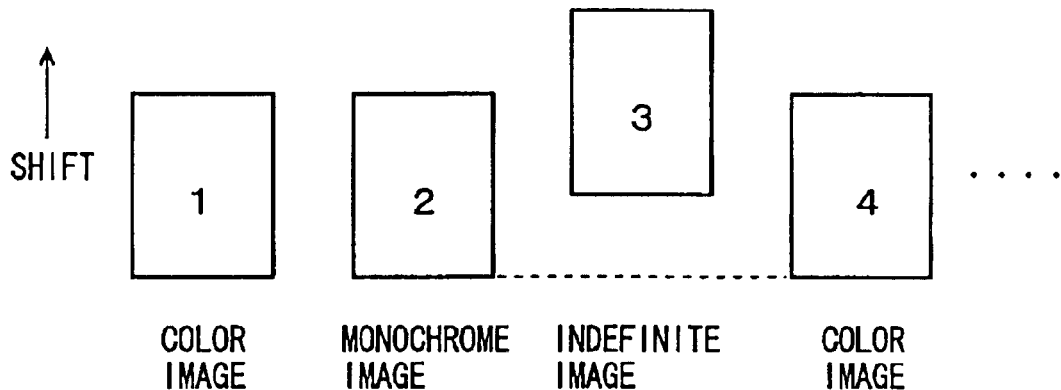
FIG. 10 is a diagram for illustrating a state after shift-discharging a paper subjected to copying when a result of ACS determination indicates an indefinite image.

FIG. 10 is a diagram for illustrating a state after shift-discharging the paper subjected to copying when the result of the ACS determination is an indefinite image. It is assumed that a third original image is determined as an indefinite image while the remaining original images are determined as color or monochrome images, for example.

In this case, copied papers 1, 2 and 4 for the original images other than the indefinite image are discharged to the general position while only a copied paper 3 for the indefinite original image is discharged in a state shifted from the general position along arrow, as shown in FIG. 10. It follows that the discharge tray 311 is shifted oppositely to arrow in FIG. 10 for receiving the paper.

Figure 11:
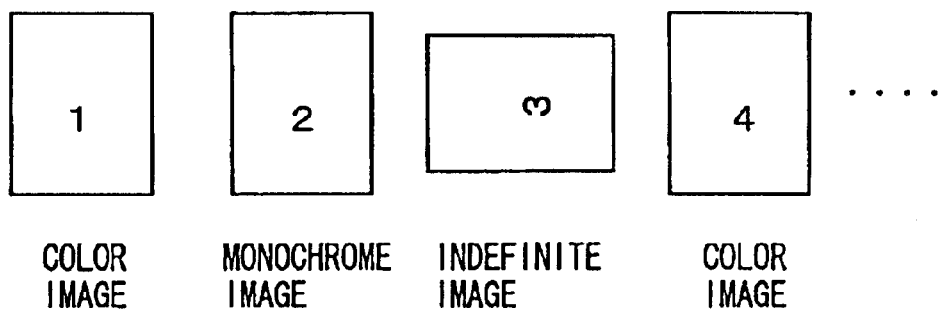
FIG. 11 is a diagram for illustrating a state after rotation-discharging a paper subjected to copying when a result of ACS determination indicates an indefinite image.

FIG. 11 is a diagram for illustrating a state after rotation-discharging the paper subjected to copying when the result of the ACS determination is an indefinite image. Similarly to the case of FIG. 10, it is assumed that only a third original image is determined as an indefinite image. In this case, it follows that only a paper 3 is discharged in a state rotated by 90°, as shown in FIG. 11.

Thus, according to the processing shown in FIG. 8, only the position for discharging the paper for the original image determined as an indefinite image changes and hence the paper can be readily taken out and confirmed. Thus, no troublesome operation is necessary for finding out miscopies from a number of copy papers but a necessary countermeasure can be immediately taken when reprinting or the like is required.

Figure 12:
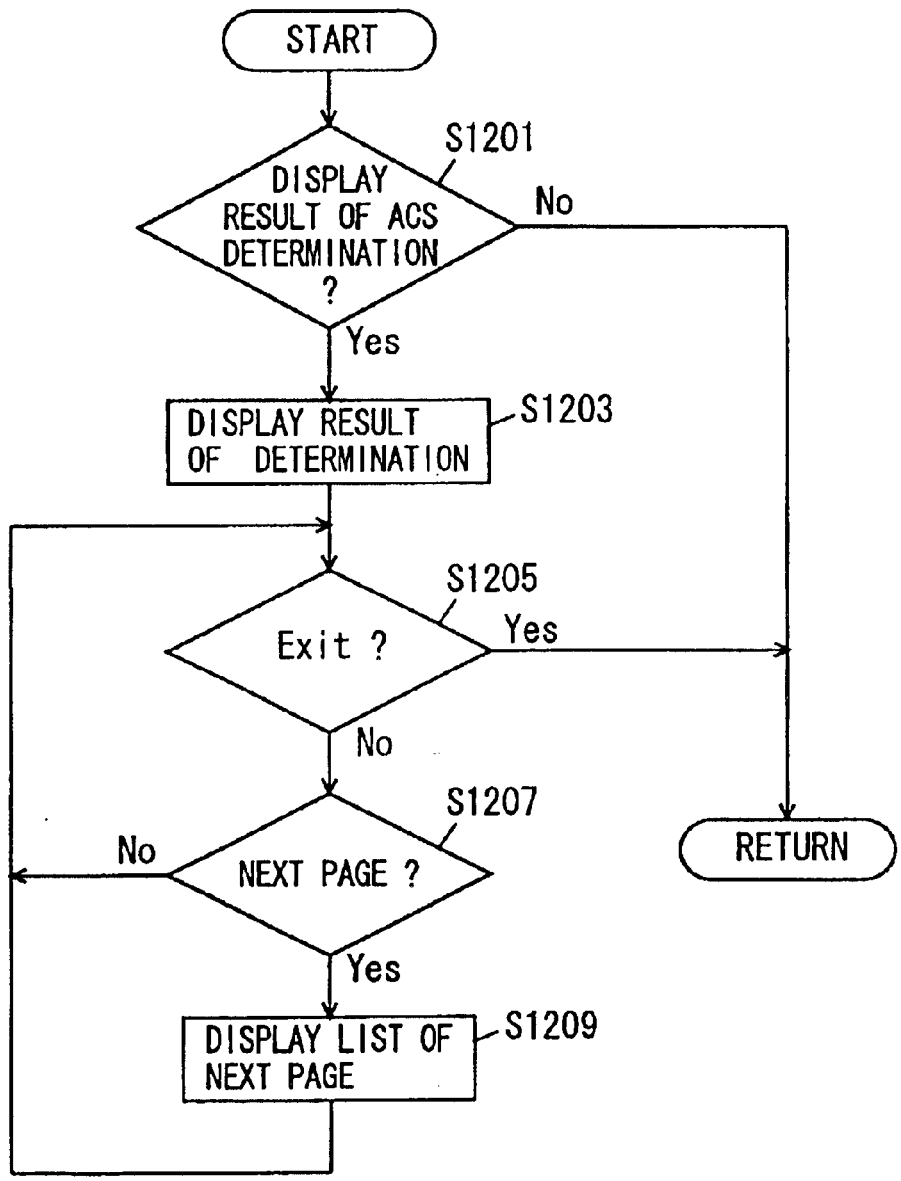
FIG. 12 is a flow chart showing the flow of ACS display processing (step S607) shown in FIG. 6.

FIG. 12 is a flow chart showing the flow of the processing of displaying the result of ACS determination (step S607) shown in FIG. 6. Referring to FIG. 12, the control part confirms that the ACS result list key 31 is pressed at a step S1201, and issues a display request at a step S1203 for displaying a list of the results of the ACS determination on the display part 24.

The control part ends this sub routine when the Exit key 35 is pressed (YES at a step S1205), while displaying a next list page at a step S1209 if the next page key 33 is pressed at a step S1207. The control part continues this ACS result list display until the Exit key 35 is pressed.

Thus, the display part 24 displays the list of the results of the ACT determination along with page numbers, whereby the user can recognize an original determined as an indefinite image at a glance. Thus, the user can immediately confirm the copy image on the basis thereof to prepare for a case requiring reprinting or the like.

While the control part issues a discharge request for each indefinite image in FIG. 8, the discharge request may alternatively be collectively issued in the initial stage. In this case, the subsequent discharge state can be decided with a single instruction, to simplify the processing.

The method of the rotation discharge is not restricted to that shown in FIG. 8 or the like but the indefinite image may also be printed on a paper in the same direction as the remaining images similarly to the shift discharge, for example. The discharge tray 311 may be rotated by a prescribed angle when discharging the paper, for discharging the same in a state different from the remaining print papers. In this case, the angle of rotation is not restricted to 90°.

The discharge method is not restricted to the shift discharge or the rotation discharge but the object paper may be discharged onto a different discharge tray, for example.

While the copy processing is collectively performed after performing ACS determination on all originals, the present invention is not restricted to this method but ACS determination and copy processing may be continuously performed on each paper. In other words, processing of performing copying immediately after ACS determination on a single original may be repeated by the number of originals.

(2) Second Embodiment

A digital color copying machine 2 according to a second embodiment of the present invention is now described. The appearance and the structure of the digital color copying machine 2 are similar to those of the digital color copying machine 1 shown in FIG. 1, and the structure of a control part of the digital color copying machine 2 is also substantially similar to that shown in FIG. 2.

Figure 13:
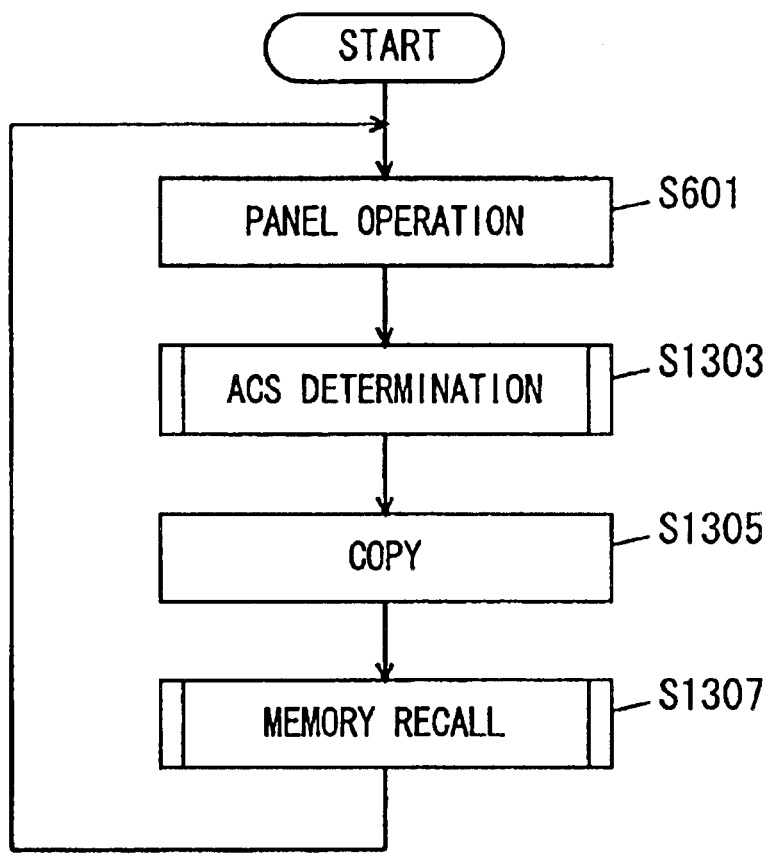
FIG. 13 is a flow chart showing a main routine of processing executed by a control part of a digital color copying machine according to a second embodiment of the present invention.

FIG. 13 is a flow chart showing a main routine of processing executed by the control part of the digital color copying machine 2 according to the second embodiment of the present invention. Referring to FIG. 13, the control part first accepts initial panel operations such as entry of a copy number and a print key, setting of various modes etc. made by a user at a step S601, similarly to the case of FIG. 6.

Then, the control part performs ACS determination for determining whether an original image is a color image, a monochrome image or an indefinite image at a step S1303.

Dissimilarly to the step S603 shown in FIG. 6, the control part performs processing for storing image data of the indefinite image, changing a determination level etc.

Then, the control part performs general copy processing at a step S1305 according to a print mode decided through the ACS determination. The control part displays the result of the ACS determination on an operation panel 32 while performing memory recall processing for displaying the original image determined as the indefinite image at a step S1307, and returns to the processing of the step S601.

Figure 14:
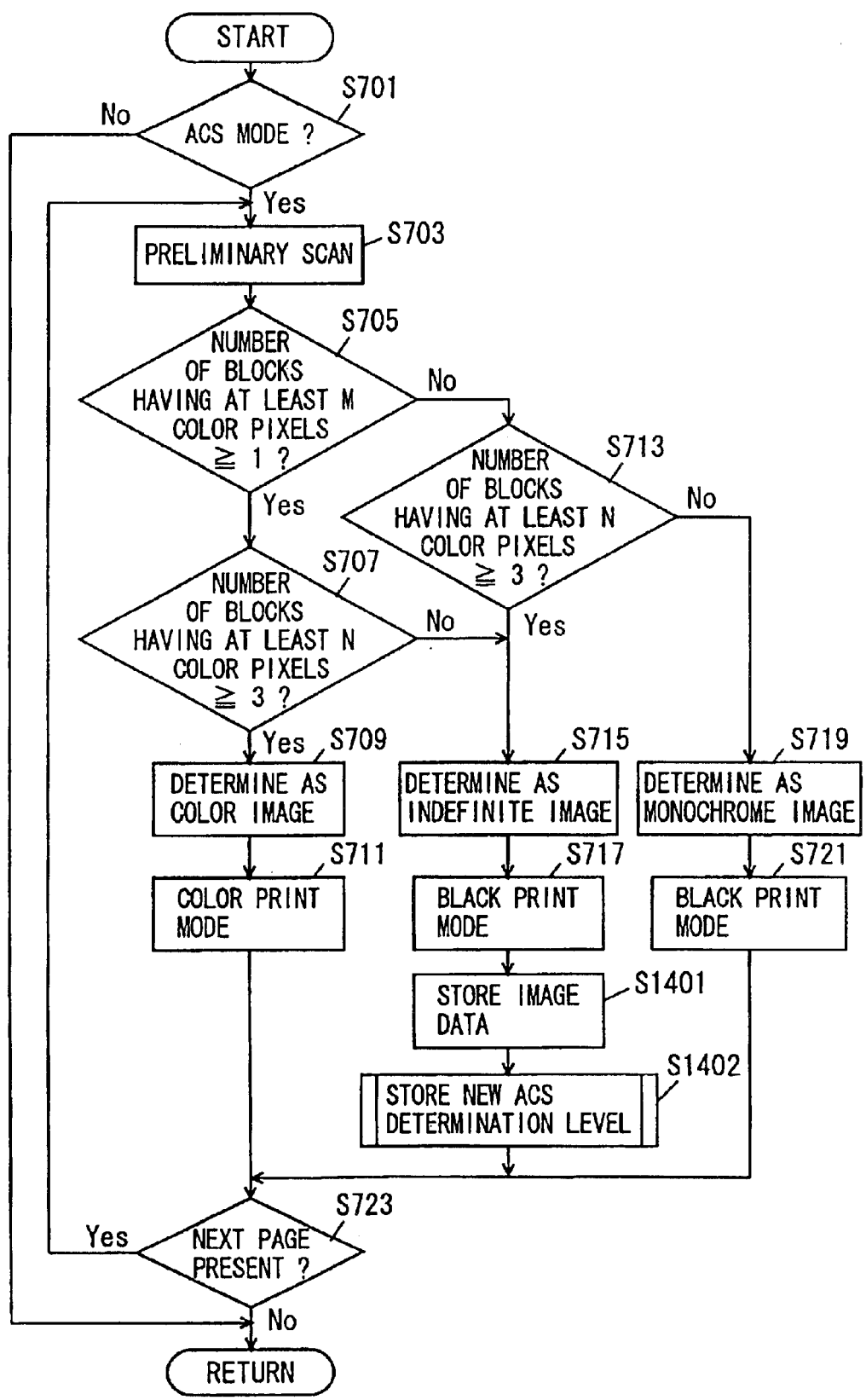
FIG. 14 is a flow chart showing the flow of ACS determination processing (step S1303) shown in FIG. 13.

FIG. 14 is a flow chart showing the flow of the ACS determination (step S1303) shown in FIG. 13. Referring to FIG. 14, the basic flow of this flow chart is similar to that of the flow chart shown in FIG. 7. However, FIG. 14 is different from FIG. 7 in a point that processing of steps S1401 and S1402 is added when the original image is determined as an indefinite image. The processing through these steps is now described.

At the step S1401, a memory part 26 stores image data of the original determined as an indefinite image for preparing for memory recall. Then, the control part stores a new ACS determination level at the step S1402. More specifically, the control part obtains a level capable of determining the original image, determined as an indefinite image, as a color image and stores the level in a prescribed area of the memory part 26.

Figure 15:
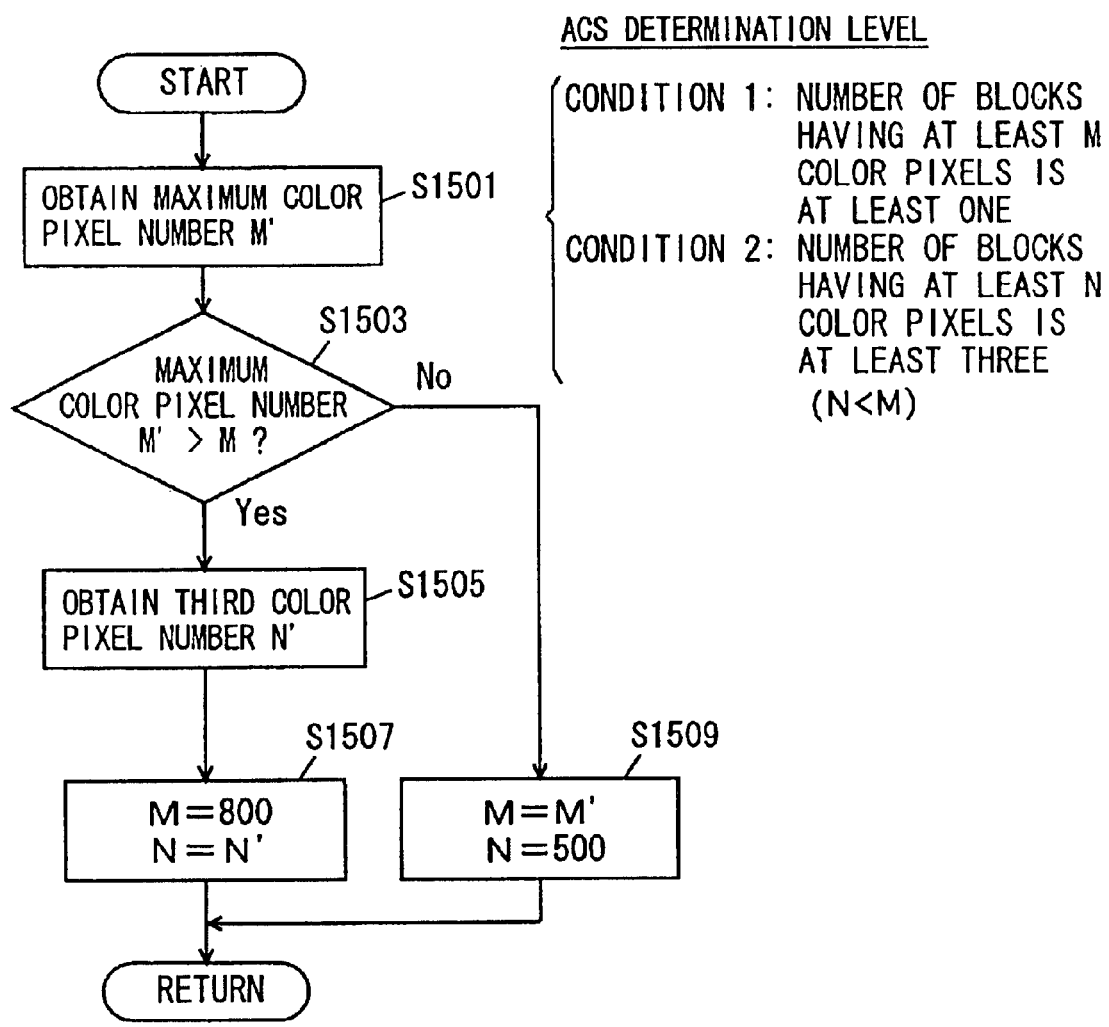
FIG. 15 is a flow chart for illustrating ACS determination level storage processing (step S1402) shown in FIG. 14.

FIG. 15 is a flow chart for illustrating the processing (step 1402) of storing the ACS determination level shown in FIG. 14. In order to simplify the illustration, a determination condition at a step S705 in FIG. 14 is referred to as a condition 1 and that at steps S707 and S713 is referred to as a condition 2. It is assumed that the contents of the conditions 1 and 2 are "the number of blocks having at least M color pixels is at least one" and "the number of blocks having at least N color pixels is at least three" respectively, where M>N.

Referring to FIG. 15, the control part obtains a maximum color pixel number M' from color pixels counted for respective blocks of an object original image, i.e., an original image determined as an indefinite image at a step S715 shown in FIG. 14, at a step S1601. Then, the control part determines whether or not the maximum color pixel number M' is greater than the color pixel number M of the condition 1 (M'>M?) at a step S1503.

When determining that the maximum color pixel number M' is greater than the color pixel number M, the control part obtains a third maximum color pixel number N' from the color pixel numbers of the respective blocks at a step S1605. Then, the control part sets this color pixel number N' as a new color pixel number N of the condition 2 (N=N') at a step S1507. In other words, it follows that the memory part 26 stores a new ACS determination level updating the color pixel number N of the condition 2 to the color pixel number N' without changing the color pixel number M of the condition 1.

This is the flow of the processing performed when determination of NO is made at the step S707 in the flow chart of FIG. 14. In this case, only the condition 2 is not satisfied while the condition 1 is satisfied, and hence it follows that only the condition 2 may be changed to a looser direction (N →N') for determining the object indefinite image as a color image.

When determining that the maximum color pixel number M' is less than the color pixel number M at the step S1503, the control part sets the maximum color pixel number M' as a new color pixel number M (M=M') of the condition 1 at a step S1509. In other words, it follows that the memory part 26 stores a new ACS determination level changing the color pixel number M of the condition 1 to the maximum pixel number M' without changing the color pixel number N of the condition 2.

This is the flow of the processing performed when determination of YES is made at the step S713 in the flow chart of FIG. 14. In this case, only the condition 1 is not satisfied while the condition 2 is satisfied, and hence it follows that only the condition 1 may be changed to a looser direction (M→M') for determining the object indefinite image as a color image.

More specifically, it is assumed that the color pixel number M of the condition 1 is 800 and the color pixel number N of the condition 2 is 500 at present, for example. It is also assumed that the maximum color pixel number M' of the object indefinite image is 750 (step S1501). In this case, the maximum color pixel number M' (750) is less than the color pixel number M (800) of the condition 1, and hence only the color pixel number M of the condition 1 is changed to 750 as a new condition (step S1509). The condition 2 is satisfied as a matter of course, and hence the color pixel number N remains 500.

When the maximum pixel number M' of the object indefinite image is 850, for example, the condition 1 is satisfied (YES at the step S1503). Assuming that the third maximum color pixel number N' is 450, this value is newly set as the color pixel number N of the condition 2 (steps S1505 and S1507). In other words, only the color pixel number N of the condition 2 is changed to 450 while keeping the color pixel number M of the condition 1 at 800.

Through the aforementioned processing, the control part stores the new ACS determination level for determining the original image, determined as an indefinite image, as a color image in the prescribed area of the memory part 26, for calling the value at need in memory recall processing described later.

Figure 16:
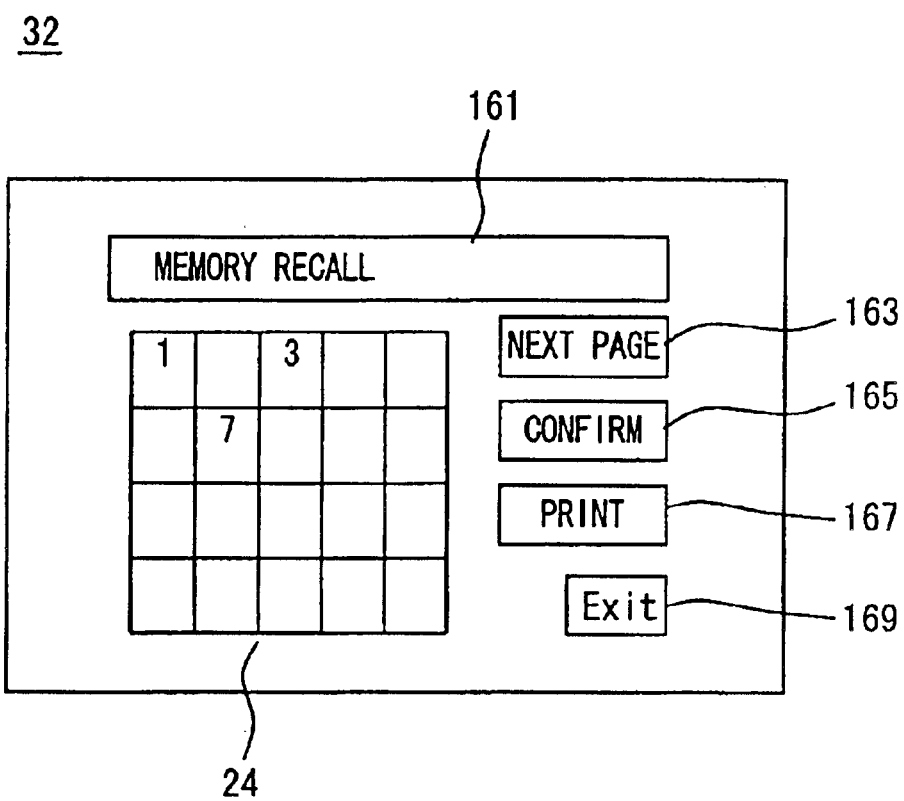
FIG. 16 is a plan view of an operation panel provided on the digital color copying machine.

Before describing memory recall processing, an operation panel 32 is described. FIG. 16 is a plan view of the operation panel 32 provided on the digital color copying machine 2. Referring to FIG. 16, the operation panel 32 includes a display part 24 for displaying a list of indefinite image pages and a specified image to an operator and an operation part 25 formed by a memory recall key 161 for setting a memory recall mode, a next page key 163 for displaying a next page of the list of the indefinite image pages, a confirm key 165 for switching the display part 24 from image display to display of the list of the indefinite image pages, a print key 167 supplying an instruction for printing a prescribed image in colors and an Exit key 169 for exiting from the memory recall mode.

The display part 24 is a liquid crystal touch panel capable of showing the numbers of pages of originals determined as indefinite images as shown in FIG. 16 and displaying an image of a specified page number. When the user presses the part of the page number of any indefinite image, it follows that the display part 24 displays the original image stored in the memory part 26. When the user presses the confirm key 165, the display part 24 returns to the original screen displaying the page numbers of the indefinite images.

Figure 17:
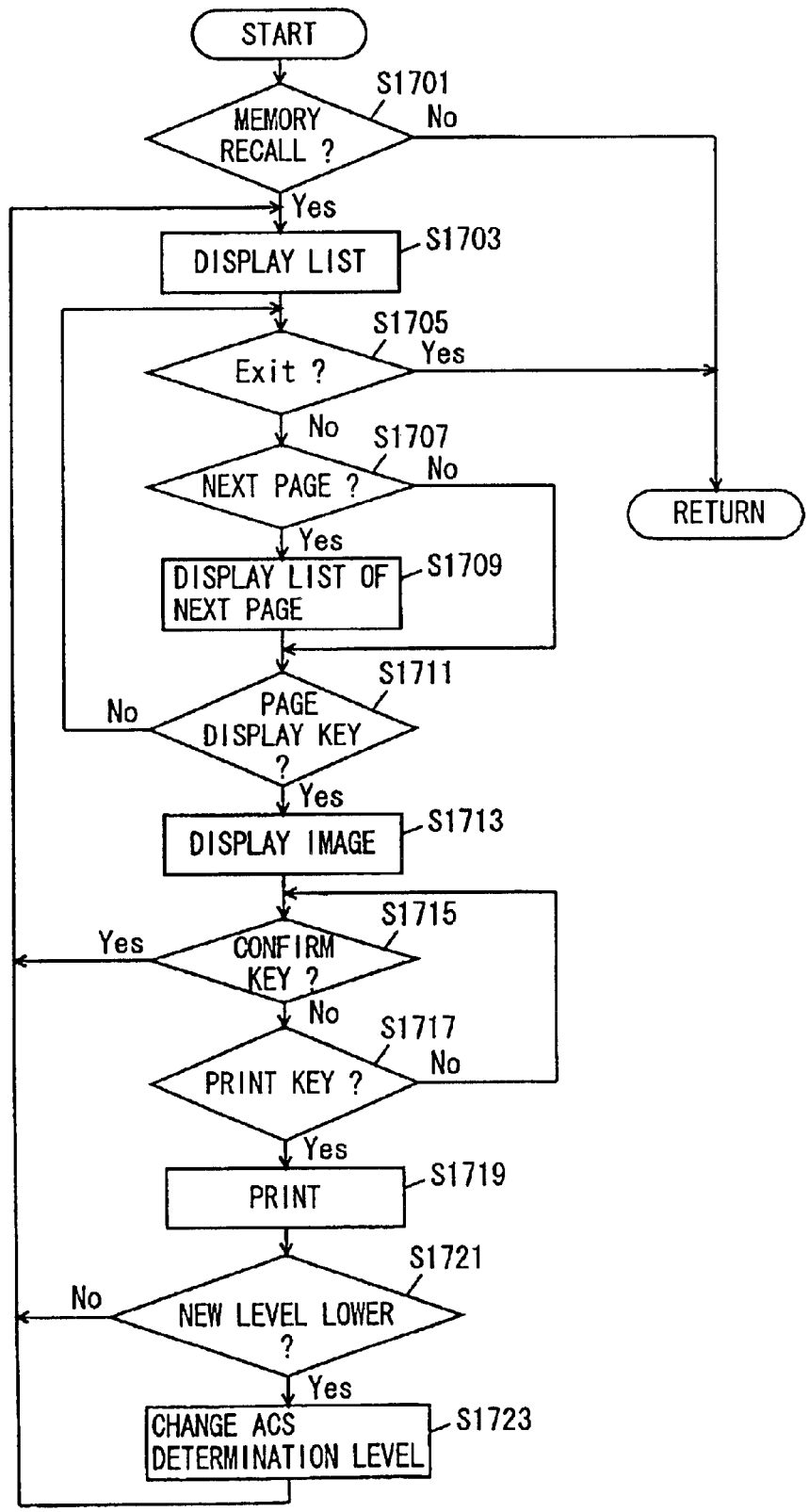
FIG. 17 is a flow chart showing the flow of memory recall processing (step S1307) shown in FIG. 13.

FIG. 17 is a flow chart showing the flow of the memory recall processing (step S1307) shown in FIG. 13. Referring to FIG. 17, when confirming that the memory recall key 161 is pressed at a step S1701, the control part issues a display request at a step S1703 for displaying the list of the page numbers of the indefinite images resulting from the ACS determination on the display part 24.

The control part ends this sub routine when the Exit key 169 is pressed (YES at a step S1705), while the control part displays a list of next page numbers of indefinite images at a step S1709 when the next page key 163 is pressed at a step S1707. The control part continuously displays the list of the page numbers of the indefinite images until the Exit key 169 is pressed at the step S1705 or a page number display key (the part of the page number of the indefinite image displayed on the display part 24) is pressed at a step S1711.

When the page number display key is pressed at the step S1711, the control part displays the original image corresponding to the specified page number on the display part 24 at a step S1713. In other words, it follows that the display on the display part 24 is switched from the list of the page numbers of the indefinite images to display of the original image.

When observing the displayed image and determining the original image as a monochrome image, the user presses the confirm key 165 at a step S1715. The display part 24 returns to the preceding screen displaying the list of the page numbers of the indefinite images (step S1703). In this case, a black copy has already been made at the step S1305 shown in FIG. 13 in a black print mode, and hence it follows that no reprinting is necessary.

When observing the displayed image and confirming that the original image is a color image, the user presses the print key 167 at a step S1717. Then, the control part makes a color copy of the displayed original image at a step S1719. In this case, reprinting with colorants is necessary.

When the print key 167 is pressed, the control part performs processing of changing an ACS criterion. In other words, the control part determines whether or not the level (the new ACS determination level stored at the step S1402 in FIG. 14) for determining the original image subjected to color printing as a color image is lower (looser) than the current ACS determination level at a step S1721, and changes the ACS determination level to the new determination level at a step S1723 when determining that the former is lower than the latter.

More specifically, it is assumed that the current determination level is M=750 (condition 1: the step S705 in FIG. 14) and N=500 (condition 2: the steps S707 and S713 in FIG. 15). Assuming that the new condition level (the new ACS determination level stored in the storage part 26 at the step S1507 or S1509 in FIG. 15) is M=760 (condition 1) and N=500 (condition 2), the color pixel numbers M and N of the new determination level are higher than those of the current determination level, and hence the control part makes determination of NO at the step S1721 not to change the ACS determination level.

Assuming that the new determination level is M=750 (condition 1) and N=450 (condition 2), on the other hand, the color pixel number N of the new determination level is lower than that of the current determination level, and hence the control part makes determination of YES at the step S1721. Then, it follows that the ACS determination level is changed to the new determination level, i.e., M=750 (condition 1) and N=450 (condition 2) at a step S1723.

Thereafter the display part 24 returns to the screen displaying the list of the page numbers of the indefinite images at the step S1703, and the control part repeats the aforementioned processing until the Exit key 169 is pressed.

According to the aforementioned processing, a specified indefinite original image can be displayed on the screen, and hence no operation is required for finding out a miscopy from copied papers. Therefore, a miscopy can be confirmed on the screen to be subjected to reprinting.

Image data of the original determined as an indefinite image is stored and hence no rereading may be performed when reprinting is necessary. Therefore, it follows that a copy is immediately made when a request for color copying is issued.

When the image determined as indefinite is a color image, the ACS determination level is changed to a new determination level for determining the original image as a color image, and hence subsequent determination is rendered more correct, leading to reduction of the number of miscopies.

While the control part sets the black print mode when determining the original image as an indefinite image at the step S717 shown in FIG. 14, a color print mode may alternatively be set as described with reference to FIG. 2. In this case, it follows that reprinting with a black colorant is performed when the print key 167 is pressed.

(2-1) First Modification

A first modification of the digital color copying machine 2 according to the second embodiment of the present invention is described. While the digital color copying machine 2 changes the ACS determination level when the control part requests color printing (reprinting) at the step S1717 shown in FIG. 17, the new ACS determination level is according to the processing (step S1402) of storing the ACS determination level shown in FIG. 14, i.e., the flow chart shown in FIG. 15.

The first modification has a different method of deciding a new ACS determination level. In this method, not a certain ACS determination level is arbitrarily changed but the optimum one is selected from previously stored prescribed determination levels.

FIG. 18 is a diagram showing ACS determination level for illustrating processing of changing the ACS determination level according to the first modification. As shown in FIG. 18, the ACS determination levels include levels 1 to 4. Referring to each level, a condition 1 corresponds to the contents of determination at the step S705 shown in FIG. 14, and a condition 2 corresponds to the steps S707 and S713 shown in FIG. 14.

First, the level 1 having the strictest conditions is selected for making ACS determination on the basis of the level 1. It follows that the level 1 can be properly changed to a level having looser conditions depending on a result of subsequent determination etc.

First, an original image is determined as an indefinite image when either the condition 1 or 2 is not satisfied with reference to the level 1. It is assumed that the original image is determined as a color image with reference to the level 2, for example. Then, it follows that the memory part 26 stores the level 2 as a new ACS determination level. Assuming that the original image is determined as an indefinite image with reference to the level 2 and determined as a color image with reference to the level 3, for example, it follows that the memory part 26 stores the level 3 as a new ACS determination level.

Thus, it follows that a level for determining an original image, determined as an indefinite image, as a color image is selected from prescribed levels and stored in the memory part 26 as a new ACS determination level at the step S1402 shown in FIG. 14.

Therefore, when an original image determined as an indefinite image is a color image, i.e., when a miscopy is made, the ACS determination level is properly changed to any of previously stored prescribed ACS determination levels, whereby the changed level can be readily decided.

While the ACS determination levels are in four stages in the first modification, the present invention is not restricted to this but a proper number of stages can be set in response to the memory capacity or the like.

(2-2) Second Modification

A second modification of the digital color copying machine 2 according to the second embodiment of the present invention is now described. While the digital color copying machine 2 stores image data only as to an original image determined as an indefinite image at the step S1401 shown in FIG. 14, the second modification stores all original images.

FIG. 19 is a flow chart showing the flow of ACS determination processing (step S1303) shown in FIG. 13 according to the second modification. Referring to FIG. 19, the processing of the step S1401 shown in FIG. 14, i.e., the processing of storing image data of an original image determined as an indefinite image is replaced with processing of storing image data of originals at a step S704.

In other words, the second modification stores image data of not only an indefinite image but also all original images. Therefore, the second modification can call the image data not only as to the indefinite image but also as to all images if necessary. When reprinting is instructed for any original image, therefore, the original image can be immediately reprinted with no rereading since the original image is stored.

(3) Third Embodiment

Finally, a digital color copying machine 3 according to a third embodiment of the present invention is described. The digital color copying machine 3 is different from the digital color copying machine 2 according to the second embodiment in the flow of processing of a main routine of a control part. The digital color copying machine 3 does not perform processing such as memory recall on a miscopy after performing copying but performs memory recall etc. before performing copying. Other structures of the copying machine 3 in accordance with the present embodiment are similar to those of the copying machine 2 in accordance with the second embodiment.

Figure 20:
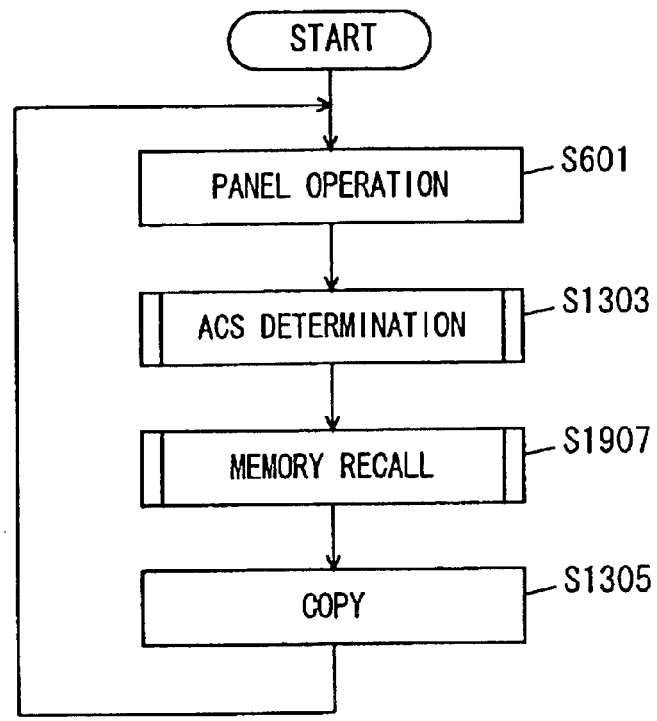
FIG. 20 is a flow chart showing a main routine of processing executed by a control part of a digital color copying machine according to a third embodiment of the present invention.

FIG. 20 is a flow chart showing the main routine of processing performed by the control part of the digital color copying machine 3 according to the third embodiment of the present invention. Referring to FIG. 20, the control part first accepts initial panel operations such as entry of a copy number and a print key, setting of various modes etc. made by a user at a step S601, similarly to the case of FIG. 13.

Then, the control part performs ACS determination for determining whether an original image is a color image, a monochrome image or an indefinite image at a step S1303. The control part also performs processing for storing image data of the indefinite image and changing a determination level. The processing through the steps S601 and S1303 is similar to the flow of the processing of the digital color copying machine 2 shown in FIG. 13.

Then, the control part performs not copying but memory recall processing at a step S1907. Thereafter the control part performs copying at a step S1305. In other words, the control part changes a print mode for the indefinite image before copying, if necessary. The control part copies the original image according to a finally decided print mode.

Figure 21:
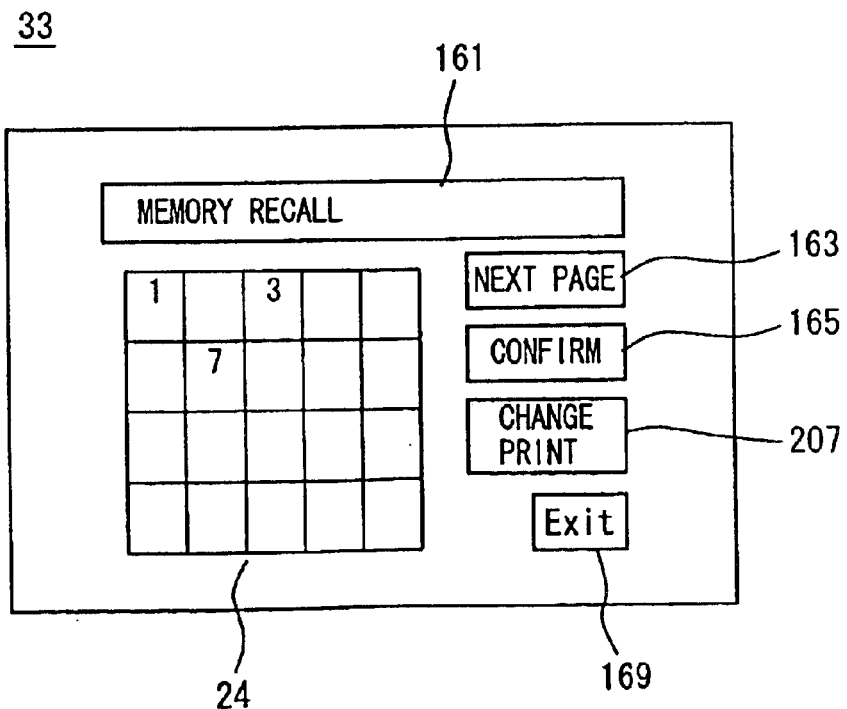
FIG. 21 is a plan view showing an operation panel of the digital color copying machine according to the third embodiment of the present invention.

FIG. 21 shows an operation panel 33 of the digital color copying machine 3 according to the third embodiment. Referring to FIG. 21, the operation panel 33 is different from the operation panel 32 of the digital color copying machine 2 shown in FIG. 16 in a point that the same includes a print change key 207 for changing the print mode from a black print mode to a color print mode in place of the print key 167.

Figure 22:
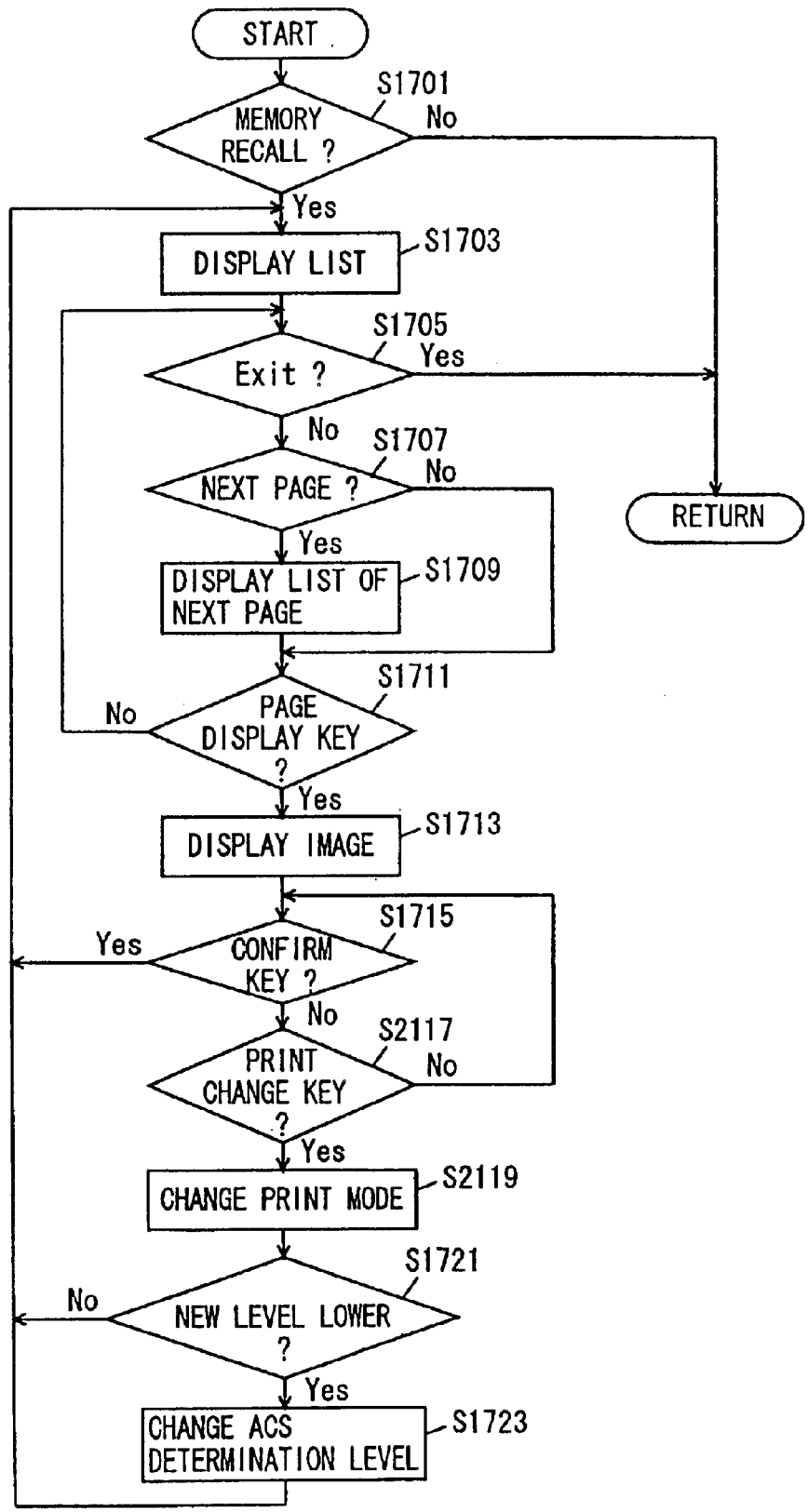
FIG. 22 is a flow chart showing the flow of memory recall processing (step S1907) shown in FIG. 20.

FIG. 22 is a flow chart showing the flow of the memory recall processing (step S1907) shown in FIG. 20. The memory recall processing shown in FIG. 22 is absolutely similar to the memory recall processing shown in FIG. 17 except steps S2117 and S2119.

In other words, the control part performs processing of changing the print mode to the color print mode at the steps S2117 and S2119 in place of the color print processing at the steps S1717 and S1719 shown in FIG. 17. Copying is not yet performed at this point of time and hence no reprinting with colorants is required but only the print mode may be changed for next copying.

When the print change key 207 is pressed at the step S2117, therefore, the control part changes the print mode from the black print mode to the color print mode at the step S2119.

When an Exit key 169 is pressed and the control part exits from this sub routine at a step S1705, it follows that copying is performed according to the finally decided print mode at a step S1305 shown in FIG. 20.

According to the aforementioned processing, the image of an original determined as an indefinite image is displayed before copying and hence the print mode can be changed to the optimum one. Therefore, a miscopy can be prevented by performing proper processing before printing.

The ACS determination level in FIG. 7, 14 or the like is not restricted to the conditions 1 and 2 but may alternatively be set with other conditions.

While the operation panel shown in FIG. 3, 16, 21 or the like displays the page numbers of the originals and the results of the determination in association with each other, the same may alternatively display printed papers as output and the results of the determination in association with each other. In this case, a printed paper for an indefinite image can be readily specified.

If not the black print mode but the color print mode is initialized for an indefinite image in the third embodiment, it follows that the print mode is changed from the color print mode to the black print mode when the print change key 207 is pressed.

While each of the above embodiments and modifications has been described on the premise that the digital copying machine is used in a stand-alone state, the present invention is also applicable to an apparatus connected to a network, as a matter of course. In this case, a second apparatus can execute the ACS determination, the copy processing, the processing of displaying results of ACS determination and the memory recall processing according to the present invention on the basis of image data fed from a first apparatus connected with the network, for example. Alternatively, the first apparatus may perform the ACS determination according to the present invention and transmit data of the results of the determination to the second apparatus so that the second apparatus executes the copy processing, the processing of displaying results of the ACS determination and the memory recall processing according to the present invention. In such a mode, the apparatus to which the present invention is applied is not restricted to a digital color copying machine but may be a color printer, a computer or the like.

The present invention can also be grasped as a software program for executing ACS determination, copy processing, processing of displaying results of ACS determination and memory recall processing. When the aforementioned software program is stored in a recording medium such as a memory (more specifically, a ROM or the like) such as the storage part 29 of the present invention, a CD or a DVD, for example, and loaded on a computer at need, the computer attains the functions of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

a determining part determining whether an original image is a color image, a monochrome image or an indefinite image hard to determine on the basis of image data corresponding to said original image;

a print part printing said original image on a sheet;

a discharge part discharging said sheet formed with an image by said print part; and a control part making said discharge part discharge a sheet formed with an original image determined as said indefinite image in a different mode from other sheets.

2. The image forming apparatus according to claim 1, wherein said control part makes said discharge part discharge said sheet formed with said original image determined as said indefinite image in a state shifted by a prescribed quantity with respect to other sheets.

3. The image forming apparatus according to claim 1, wherein said control part makes said discharge part discharge said sheet formed with said original image determined as said indefinite image in a state rotated by a prescribed angle with respect to other sheets.

4. An image forming apparatus comprising:

a determining part determining whether an original image is a color image, a monochrome image or an indefinite image hard to determine on the basis of image data corresponding to said original image on the basis of a prescribed criterion;

a print part printing said original image on a sheet;

a storage part storing image data of at least an original image determined as said indefinite image;

an operation part accepting an operation requiring reprinting of said original image determined as said indefinite image; and a control part controlling said print part to reprint said original image determined as said indefinite image on the basis of said image data stored in said storage part when reprinting is required through said operation part.

5. The image forming apparatus according to claim 4, further comprising a mode decision part deciding a print mode for said original image as a color mode printing said original image with a colorant or a black mode printing said original image with a black colorant on the basis of a result of said determination, wherein said control part controls said print part to reprint said original image determined as said indefinite image in a print mode different from said print mode decided by said mode decision part.

6. The image forming apparatus according to claim 5, wherein
    said mode decision part decides a print mode for said original image determined as said indefinite image as said black mode, and
    said control part controls said print part to reprint said original image determined as said indefinite image in said color mode.

7. The image forming apparatus according to claim 4, further comprising a display part displaying said original image on the basis of said image data stored in said storage part, wherein
    said operation part accepts an operation displaying said original image determined as said indefinite image on said display part while accepting an operation requiring reprinting of said displayed original image.

8. The image forming apparatus according to claim 4, wherein said control part changes said criterion of said determining part when executing reprinting of said original image determined as said indefinite image.

9. The image forming apparatus according to claim 4, wherein
    said storage part stores all original images determined by said determining part.

10. An image forming apparatus comprising:
    a determining part determining whether an original image is a color image, a monochrome image or an indefinite image hard to determine on the basis of image data corresponding to said original image;
    a mode decision part deciding a print mode for said original image as a color mode printing said original image with a colorant or a black mode printing said original image with a black colorant on the basis of a result of said determination;
    a print part printing said original image on a sheet according to said print mode decided by said mode decision part;
    an operation part accepting an operation requiring change of said print mode decided by said mode decision part on an original image determined as said indefinite image; and
    a control part controlling said print part to print said original image determined as said indefinite image in a changed print mode in place of said print mode decided by said mode decision part when change of said print mode is required through said operation part.

11. The image forming apparatus according to claim 10, further comprising:
    a storage part storing image data of at least said original image determined as said indefinite image, and
    a display part displaying said original image on the basis of said image data stored in said storage part, wherein
    said operation part accepts an operation displaying said original image determined as said indefinite image on said display part while accepting an operation requiring change of said print mode for said displayed original image.

12. The image forming apparatus according to claim 10, wherein
    said mode decision part decides the print mode for said original image determined as said indefinite image as said black mode.

* * * * *

UNITED STATES PATENT AND TRADEMARK OFFICE
CERTIFICATE OF CORRECTION

PATENT NO. : 6,900,902 B1 Page 1 of 1
DATED : May 31, 2005
INVENTOR(S) : Hiroharu Tanaka It is certified that error appears in the above-identified patent and that said Letters Patent is hereby corrected as shown below:

<u>Title page,</u>
Item [56], References Cited, FOREIGN PATENT DOCUMENTS, change "1/1996" to -- 1/1999 --.

Signed and Sealed this

Twenty-third Day of May, 2006

JON W. DUDAS
*Director of the United States Patent and Trademark Office*